United States Patent
Agner

(10) Patent No.: US 6,431,012 B1
(45) Date of Patent: Aug. 13, 2002

(54) TORQUE SENSOR FOR A MOTOR VEHICLE POWER TRAIN

(75) Inventor: Ivo Agner, Bad Homburg (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/268,985

(22) Filed: Mar. 16, 1999

(30) Foreign Application Priority Data

Mar. 19, 1998 (DE) ......................................... 198 12 033

(51) Int. Cl.[7] ............................ F16H 61/00; G01L 3/00
(52) U.S. Cl. ................................... 73/862.08; 474/18
(58) Field of Search ........................ 73/862.08, 862.33, 73/862.334, 862.335, 474.18

(56) References Cited

U.S. PATENT DOCUMENTS

| | | | |
|---|---|---|---|
| 5,169,365 A | 12/1992 | Friedmann | 474/18 |
| 5,295,915 A | 3/1994 | Friedmann | 474/18 |
| 5,711,730 A | 1/1998 | Friedman et al. | 474/18 |
| 5,879,253 A | 3/1999 | Friedmann et al. | 474/18 |
| 6,106,420 A * | 8/2000 | Ketelaars et al. | 474/18 |
| 6,110,062 A * | 8/2000 | Fujikawa | 474/18 |

* cited by examiner

*Primary Examiner*—Benjamin R. Fuller
*Assistant Examiner*—Andre Allen
(74) *Attorney, Agent, or Firm*—Darby & Darby

(57) ABSTRACT

A torque sensor between a rotary input element driven by an engine and a coaxial output element connected to a continuously variable transmission in the power train of a motor vehicle has a plenum chamber for a supply of hydraulic fluid. The chamber is defined by two coaxial valve members of a pressure reducing valve. One valve member is connected to the output element and is movable axially relative to the other valve member, which rotates with the input element, to change the fluid pressure in the chamber. An inlet opening of the valve serves to connect the chamber with the outlet of a pump which supplies pressurized fluid, and such opening is at least partially exposed in at least one first and sealed in at least one second position of the one valve member. A first outlet opening of of the valve can be exposed or sealed by the one valve member to respectively permit and prevent the flow of fluid between the chamber and a sump, and a second outlet opening of the valve serves to permit the flow of fluid from the chamber to one or more cylinder-and-piston units which regulate the operation of the transmission.

19 Claims, 1 Drawing Sheet

TORQUE SENSOR FOR A MOTOR VEHICLE POWER TRAIN

BACKGROUND OF THE INVENTION

The invention relates to improvements in apparatus for regulating the operation of certain constituents in the power trains of motor vehicles, for example, for regulating the operation of continuously variable transmissions in dependency upon the changes of one or more parameters of the motor vehicle, of its power train and/or other variables. Still more particularly, the invention relates to improvements in torque regulating apparatus which employ so-called torque sensors.

Commonly owned U.S. Pat. No. 5,169,365 (granted Dec. 8, 1992 to Oswald Friedmann for "POWER TRAIN") discloses a power train wherein the engine of the motor vehicle transmits torque to a continuously variable transmission (CVT) by way of a rotary torque sensor which is connected to the output of a pump serving to supply a pressurized hydraulic fluid. The torque sensor acts as or includes a valve and serves to transmit torque from the engine to the input element of the transmission. As a rule, the valve of the torque sensor comprises or defines a plenum chamber and is designed to transmit at least a portion of the torque between the output element of the engine and the input element of the transmission. Reference may also be had to commonly owned published German patent application Serial No. 195 44 644. The disclosure of each and every patent and each and every patent application (including the commonly owned German priority patent application Serial No. 198 12 033.8 filed Mar. 19, 1998) identified in the specification of the present application is intended to be considered as having been incorporated herein by reference.

As a rule, the torque sensor which is utilized in conjunction with a continuously variable transmission serves to eliminate or prevent the development of play between the component parts of the transmission in dependency upon the load and/or torque. Such elimination of play ensures reliable engagement between the lateral surfaces of an endless flexible element (such as a chain or a belt) and the adjacent conical surfaces of the flanges forming part of adjustable pulleys or sheaves in the continuously variable transmission. Thus, the torque sensor can ensure the development and a continuous transmission of a force the magnitude of which is dependent upon load and/or torque and which prevents the flexible element and the pulleys of the continuously variable transmission from slipping relative to each other. As a rule, the regulation of forces acting between the marginal surfaces of the flexible element and the conical surfaces of the flanges forming part of adjustable pulleys is effected by hydromechanical means.

The establishment of an optimal frictional engagement between the flexible element and the pulleys of the continuously variable transmission is desirable and important because the selection of an optimum frictional engagement brings about substantial savings in fuel (in comparison with the fuel consumption when the frictional engagement between the flanges of the pulleys and the flexible element is excessive). On the other hand, if the frictional engagement is insufficient, the flexible element and the pulleys are likely to slip relative to each other which entails unnecessary and highly pronounced wear affecting the useful life of the power train. The hydromechanical torque sensor is intended to select an optimum frictional engagement between the endless flexible element and the pulleys such as ensures savings in fuel, i.e., to select a frictional engagement which is best suited for the transmission of torque at an optimum rate.

It is already known to design a torque sensor for use in conjunction with a continuously variable transmission in such a way that it employs a valve which controls the pressure of fluid in a plenum chamber in response to abrupt changes of transmitted torque. This is accomplished in that the valve seals a path for the flow of hydraulic fluid from the chamber into the sump, a path which is defined in part by a flow restrictor. The sealing step takes place in response to a shifting of a mobile part of the torque sensor. As a rule, the valve is a pressure limiting or pressure relief valve which regulates the fluid pressure in the plenum chamber in dependency on the magnitude of the torque to be transmitted as a function of the required transmission ratio as soon as the plenum chamber is sealed from the outlet leading to the sump.

The minimal fluid pressure which a conventional torque sensor employing a pressure relief valve can select for the fluid in the plenum chamber is determined by the remaining hydrodynamic pressure in the conduit or port leading to the conduit or port connecting the plenum chamber with the sump. Thus, one can realize or achieve a fluid pressure which is proportional to the momentarily prevailing torque only after the sensor already transmits a torque of predetermined minimum magnitude, i.e., when the fluid pressure reaches or exceeds a predetermined value.

OBJECTS OF THE INVENTION

An object of the invention is to provide a novel and improved torque sensor which can be utilized in conjunction with a continuously variable transmission.

Another object of the invention is to provide an apparatus which is associated with a transmission in the power train of a motor vehicle and embodies the improved torque sensor.

A further object of the invention is to provide a torque sensor which is designed to ensure that an optimum fluid pressure necessary to ensure a desired mode of operation of adjusting units utilized in a continuously variable transmission will be available under all or practically all circumstances which are anticipated in actual use of a power train embodying the transmission.

An additional object of the invention is to provide a novel and improved valve for use in the above outlined torque sensor.

Still another object of the invention is to provide a torque sensor which can be utilized as a superior substitute for conventional torque sensors in the power trains of motor vehicles, especially in power trains which embody continuously variable transmissions.

A further object of the invention is to provide a method of influencing the operation of a torque sensor in the power train of a motor vehicle.

Another object of the invention is to provide a relatively simple, inexpensive, compact and highly versatile torque sensor for use in conjunction with a transmission in the power train of a motor vehicle.

An additional object of the invention is to provide a novel and improved system of valves for use in the hydraulic circuit of an apparatus employing the above outlined torque sensor.

Still another object of the invention is to provide a combined torque sensor and torque transmitting device which can be utilized, with appropriate controls therefor, in the power train of a motor vehicle, particularly between the rotary output element of the prime mover and the input element of a transmission, such as a continuously variable transmission.

SUMMARY OF THE INVENTION

The invention is embodied in a rotary torque sensor which is arranged to transmit torque between rotary input and output elements, e.g., between a shaft which is driven by the camshaft or crankshaft of an internal combustion engine and a shaft which transmits torque to one adjustable pulley of a continuously variable transmission. The improved sensor has a plenum chamber and comprises a pressure reducing valve arranged to control the flow of a hydraulic fluid (e.g., oil) into and from the chamber. The valve has at least two valve members at least one of which is movable relative to the other valve member to thereby vary the pressure of fluid in the chamber and to thus influence the capacity of the torque sensor to transmit torque between the input and output elements. The torque sensor further comprises or cooperates with a pump or another suitable source of pressurized fluid which is connectable to the plenum chamber by the aforementioned valve.

In accordance with one presently preferred embodiment, the valve has an inlet opening connectable to the aforementioned source of pressurized fluid, a first outlet opening which is connectable to a fluid collecting device (e.g., a sump), and a second outlet opening connectable with at least one adjusting unit (such as a cylinder-and-piston unit) of a transmission, particularly a continuously variable transmission.

One of the openings can be provided in the one valve member, and such one valve member can be arranged to rotate with the input element. Alternatively, at least one of the openings can be provided in the one valve member.

The valve can be operated in such a way that the one valve member is movable to at least one position in which at least two of the openings (such as the inlet opening and the first outlet opening) are sealed.

Alternatively, the arrangement can be such that the one valve member is movable relative to the other valve member to at least one position in which the inlet opening and the first outlet opening are at least partially exposed to permit pressurized fluid to flow from the source into the plenum chamber and to flow from the chamber to the fluid collecting device.

Still further, it is possible to design the valve in such a way that, when the one valve member is moved relative to the other valve member to at least one preselected position, the inlet opening is sealed to prevent pressurized fluid from flowing from the source into the plenum chamber and the first outlet opening is also sealed to prevent fluid from flowing between the chamber and the fluid collecting device.

It is also possible to design the valve in such a way that the one valve member is movable relative to the other valve member to at least one position in which the inlet opening is sealed to prevent pressurized fluid from flowing from the source into the plenum chamber while the first outlet opening is at least partially exposed to permit fluid to flow between the chamber and the fluid collecting device.

The one valve member and the other valve member can be provided with first and second substantially radially extending profiled portions which confront each other, and such torque sensor can further comprise one or more torque- and force-transmitting elements (e.g., in the form of spheres) between the two profiled portions. The other valve member can be connected for rotation with the input element, and the one valve member can be connected for rotation with the output element of the torque sensor. The magnitude of the force which is being transmitted by the at least one torque- and force-transmitting element is or can be at least substantially proportional to the pressure of fluid in the plenum chamber.

It is also possible to design the valve in such a way that it has an inlet opening connectable with the source of pressurized fluid and an outlet opening connectable with at least one adjusting unit of a transmission, such as a continuously variable transmission.

At least one of the two openings is or can be provided in the other valve member which is arranged to rotate with the input element. It is also possible to provide at least one of the two openings in the one valve member which is arranged to rotate with the output element. Still further, at least one of the two openings can be sealed in response to movement of the one valve member relative to the other valve member.

The valve with only two openings can be designed in such a way that the one valve member is movable relative to the other valve member to at least one position in which at least the inlet opening is at least partially exposed to permit pressurized fluid to flow from the source into the plenum chamber. It is also possible to move the one valve member to a position in which only the inlet opening is at least partially exposed to permit pressurized fluid to flow from the source into the plenum chamber.

Still further, and as already described in connection with the embodiment wherein the valve has an inlet opening and two outlet openings, the valve members of the valve having an inlet opening an one outlet opening can be provided with first and second substantially radially extending profiled portions contacting at least one force and torque-transmitting element (such as a sphere) which also serves to shift the one valve member relative to the other valve member. The one valve member is axially movably but non-rotataby connected to the output element, and the other valve member is or can be fixedly secured to the input element. The magnitude of the force being transmitted by the at least one force- and torque-transmitting element is or can be at least substantially proportional to the pressure of fluid in the plenum chamber.

The novel features which are considered as characteristic of the invention are set forth in particular in the appended claims. The improved torque sensor itself, however, both as to its construction and its mode of operation, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

The single FIGURE (FIG. 1) is a fragmentary partly sectional and partly diagrammatic view of a torque sensor which embodies one form of the present invention and is associated with a continuously variable transmission in the power train of a motor vehicle.

DESCRIPTION OF PREFERRED EMBODIMENTS

Figure 1:
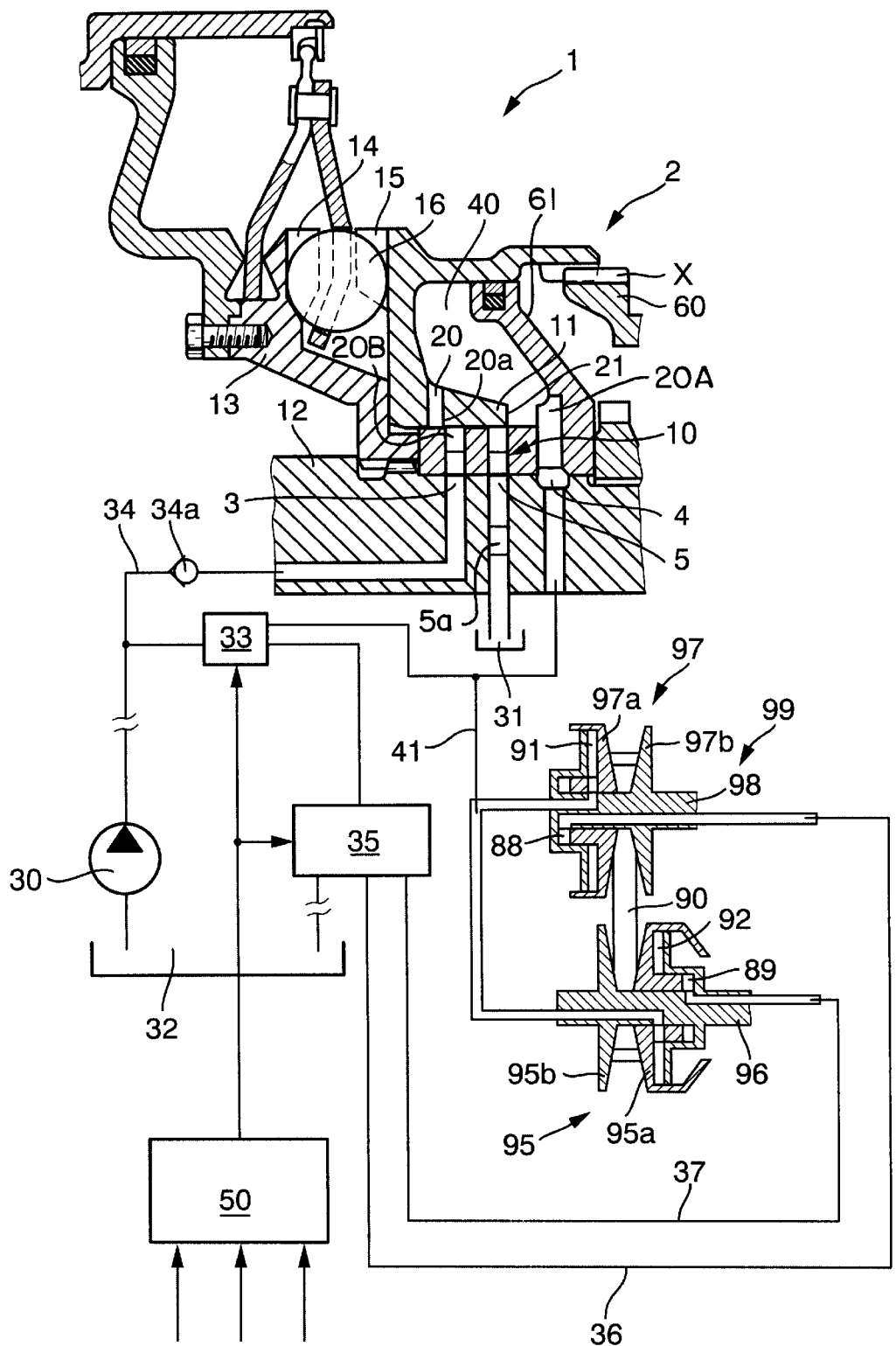

FIG. 1 shows a portion of a continuously variable transmission (CVT) 99 having a rotary driving unit and a rotary driven unit receiving torque from the driving unit by way of at least one endless flexible element 90 (e.g., a belt or a chain and hereinafter called chain). The driving unit comprises a shaft 98 and an adjustable pulley or sheave 97 having a first conical flange 97b affixed to the shaft 98 and a second conical flange 97a rotatable with and movable axially of the shaft 98 toward and away from the flange 97b. The driven unit of the transmission 99 comprises a rotary shaft 96 which is or which can be parallel to the shaft 98 and an adjustable pulley or sheave 95 composed of a first conical flange 95b affixed to the shaft 95 and a second conical flange 95a arranged to rotate with and being movable axially of the shaft 95 toward and away from the flange 95b. The chain 90 is trained over the pulleys 95 and 97.

The driving unit of the transmission 99 further comprises means for adjusting the axial position of the axially movable flange 97a of the pulley 97 relative to the axially fixed flange 97b, and such adjusting means comprises two cylinder-and-piston units 88 and 91. Analogously, the driven unit of the transmission 99 comprises means for adjusting the axial position of the axially movable flange 95a relative to the axially fixed flange 95b of the pulley 95, and such adjusting means also comprises two cylinder-and-piston units 89, 92.

The chain 90 can be designed to rotate the pulley 95 and the shaft 96 in response to rotation of the pulley 97 with the shaft 98 or vice versa.

Axial adjustments of the conical flange 97a, accompanied by commensurate axial adjustments of the flange 95a relative to the flange 95b, entail changes in the radii of those portions of the chain 90 which are trained over the pulleys 97, 95 and corresponding changes in the driving ratio of the transmission 99. Such ratio can change from an underdrive, which involves a rotation of the shaft 96 at a minimum speed in comparison to the RPM of the shaft 98, to an overdrive which involves a rotation of the shaft 96 at a maximum speed in comparison with the RPM of the shaft 98. When the transmission 99 is in overdrive, the radius of the chain portion which is trained over the pulley 97 assumes a maximum value while the chain 90 is trained over the pulley 95 in immediate or close proximity to the shaft 96. The situation is reversed when the transmission 99 is in underdrive, i.e., the chain 90 is then trained over the pulley 97 close to the shaft 98 and the radius of its looped portion between the flanges 95a, 95b then assumes a maximum value. In addition, the ratio of the transmission 99 can assume any one of an infinite number of intermediate values between the underdrive and the overdrive.

The cylinder-and-piston units 91 and 92 serve to select the extent of friction between the flanges 97a, 97b and 95a, 95b on the one hand, and the adjacent edge faces of the chain 90 on the other hand, i.e., the magnitudes of the forces which the pulleys 97, 95 exert upon the adjacent portions of the chain 90 in the axial directions of the respective shafts 98 and 96.

The cylinder-and-piston units 91 and 92 serve to select the extent of friction between the flanges 97a, 97b and 95a, 95b on the one hand, and the adjacent edge faces of the chain 90 on the other hand, i.e., the magnitudes of the forces which the pulleys 97, 95 can exert upon the adjacent portions of the chain 90 in the axial directions of he respective shafts 98 and 96.

The cylinder-and-piston units 88, 89 are designed and installed to operate in parallel with the respective cylinder-and-piston units 91. 92. The purpose of the cylinder-and-piston units 88, 89 is to effect infinite changes in the ratios of the transmission 99. Each of the cylinder-and-piston units 91, 92 and 88, 89 has a cylinder chamber (plenum chamber) which can be supplied with a suitable hydraulic fluid (such as oil) by way of a system of conduits including a conduit 41 for the chambers of the units 91, 92 and conduits 36, 37 for the chambers of the units 88 and 89, respectively.

The fluid pressure in the chamber of the cylinder-and-piston unit 88 is caused to increase, with a simultaneous commensurate drop of fluid pressure in the chamber of the cylinder-and-piston unit 89 (i.e., with simultaneous evacuation or expulsion of some fluid from the chamber of the unit 89), when the speed ratio of the transmission 99 is to be increased because this entails a migration of one looped portion of the chain 90 radially outwardly and away from the shaft 98 and a simultaneous migration of the other looped portion of he chain 90 toward the axis of the shaft 96. At such time, the fluid pressures in the chambers of the cylinder-and-piston units 91, 92 are maintained at values which ensure that the chain 90 does not slip relative to the adjacent conical surfaces of the flanges 97a, 97b and 95a, 95b and vice versa.

The heretofore described construction and mode of operation of the continuously variable transmission 99 are well known in the art. Reference may be had, for example, to the aforementioned commonly owned U.S. Pat. No. 5,169,365.

The pressure of fluid in the chambers of the cylinder-and-piston units 91, 92 is regulated by a valve 2 which can be operated to select the extent of frictional engagement between the flanges 97a, 97b and 95a, 95b on the one hand, and the adjacent edge faces of the chain 90 on the other hand. The valve 2 can be said to form part of a hydrokinetic torque sensor or torque monitoring means 1 and is provided with an inlet opening 20 connectable with a fluid admitting port or passage 3, a first outlet opening 20A connectable with a fluid discharging port 4 which can admit fluid into the aforesaid conduit 41 (i.e., into the chambers of the cylinder-and-piston units 91, 92), and a second fluid discharging opening 20B adapted to communicate with port 5 serving to discharge fluid into a fluid storing device 31 (e.g., a sump). In the embodiment of FIG. 1, the valve 2 comprises an axially fixed valving member 10 which can constitute a portion of or is affixed to a rotary input element 12 receiving torque from a prime mover, e.g., from the camshaft or crankshaft of an internal combustion engine in the power train of a motor vehicle. The valve 2 further comprises an axially movable valve member 11.

The input element 12 is further non-rotatably connected with a portion or arm 13 of the torque sensor 1. To this end, the connection between the input element 12 (e.g., a shaft) and the arm 13 can comprise a spur gear on the element 12 and an internal gear provided in the arm 13 and mating with the spur gear. The arm 13 includes or is connected with a circular disc-shaped profiled portion 14 having a set or ramps, cams or analogous profiles confronting a complementary set of ramps, cams or analogous profiles on the adjacent circular disc-shaped profiled portion 15 affixed to or provided on the axially movable valving member 11. One or more force- and torque-transmitting rolling elements 16 (e.g., spherical rolling elements) are disposed between the profiled portions 14, 15 of the torque sensor 1. The purpose of the rolling element(s) 16 is to move the valve member 11 axially of the valve member 10 and input element 12 in response to angular displacement of the profiled portions 14, 15 relative to each other, i,e., in response to rotation of the valve member 10, input element 12 and arm 13 relative to the valve member 11. The valve member 11 is movable axially of but is non-rotatably connected to the output element 60 of the torque sensor 1 by a set of mating gears X. The output element 60 can transmit torque to the shaft 98.

The inlet opening 20 is provided in the axially inner portion of the valve member 11, and the latter has a control edge 20a at the radially inner end of the inlet opening 20 adjacent the periphery of the valve member 10 on the input element 12. An end face 21 of the valve member 11 bounds a portion of the outlet opening 20A and constitutes a second control edge which is also adjacent to and extends radially outwardly from the peripheral surface of the valve member 10.

The dimensions and the positions of the control edges 20a and 21 are or can be selected in such a way that, in a first embodiment and in a predetermined axial position of the valve member 11 relative to the valve member 10, the port 3 in the input element 12 of the torque sensor 1 and a source 30 of pressurized hydraulic fluid are sealed from a plenum chamber 40 of the torque sensor 1 and, at the same time, the plenum chamber 40 is sealed from the port 5 and from the fluid storing device or sump 31. Such axial position of the valve member 11 relative to the axially fixed valve member 10 is shown in FIG. 1.

If the rolling element(s) 16 thereupon causes or cause the profiled portion 15 to move the valve member 11 in a direction to the right, as viewed in FIG. 1, the valve member 11 can be brought to a halt in an axial position in which the inlet opening 20 (and hence the plenum chamber 40) communicates with the source 30 (e.g., a pump) via port 3 and a check valve 34a in a conduit 34 leading from the pressure outlet of the source 30 to the port 3. At the same time, the port 5 and the sump 31 are still sealed from the plenum chamber 40.

A third axial position of the axially movable valve member 11 with reference to the axially fixed valve member 10 of the valve 2 can be seelected in such a way that the source 30 and the port 3 are sealed from the plenum chamber 40 but the latter can communicate with the sump 31 by way of the outlet opening 20A and the port 5. The third position of the mobile valve member 11 is located to the left of the first position shown in FIG. 1.

The port 4 establishes communication between the outlet opening 20B and the plenum chamber 40 on the one hand, and the chambers of the cylinder-and-piston units 91, 92 (via conduit 41) on the other hand in each of the aforementioned three axial positions of the axially movable valve member 11 relative to the axially fixed valve member 10. Thus, the pressure of fluid in the cylinder-and-piston units 91, 92 can be varied by changing the axial position of the valve member 11 relative to the valve member 10 in order to determine the fluid pressure in the chamber 40 by sealing the chamber 40 from the source 30 and sump 31, by sealing the chamber 40 only from the source 30, or by sealing the chamber 40 only from the sump 31. The valve 2 acts as a pressure reducing or relief valve.

Abrupt changes of the torque being transmitted by the torque sensor 1 entail abrupt changes in the axial position of the valve member 11, and the volume or quantity of hydrauic fluid in the plenum chamber 40 is changed abruptly because the valve member 11 defines a portion of this chamber. The valve member 11 then acts as a piston of a pump which causes the pressure of hydraulic fluid in the plenum chamber 40 (and hence in the chambers of the cylinder-and-piston units 91 and 92) to rise within a short interval of time. This also entails the availability of a quantity of fluid which flows from the plenum chamber 40 into the cylinder-and-piston units 91 and 92.

The purpose of the check valve 34a in the conduit 34 between the outlet of the source (pump) 30 and the port 3 of the input element 12 is to ensure that a stream of hydraulic fluid can flow from the source 30 toward the plenum chamber 40, i.e., toward the torque sensor 1, but not in the opposite direction.

It is further advisable to provide a flow restrictor (throttle) 5a in the port 5 or in a conduit which connects the port 5 with the sump 31. In lieu of placing it into the port 5, the flow restrictor 5a or an analogous fluid flow impeding component part can be installed in the port 4, in the conduit 41 or in the plenum chamber 40 to obtruct the flow of fluid into the sump 31. For example, the connection between the chamber 40 and a fluid storing device (such as the sump 31) can also be established, in the event of lakage, by way of a rotary inlet or the like.

The port 3 is free to convey hydraulic fluid when the fluid pressure rises but is sealed when the fluid pressue drops.

The hydraulic constituent or section of the improved apparatus comprises the aforementioned source 30 which draws hydraulic fluid from a source 32 and can supply pressurized fluid (via conduit 34 and check valve 34a) to the port 3 and thence to the inlet opening 20 of the valve 2 as well as to a pressure relief valve 33. The latter has outputs connected to the port 5 and to a distributor valve 35 serving to supply fluid to the aforementioned conduits 36, 37, i.e., to the chambers of the cylinder-and-piston units 88, 89, namely to the means for varying the ratio of he transmission 99. The valve 35 can constitute a single valve or an assembly or block of two or more discrete valves.

As shown, the valve 33 is installed upstream of the distributor valve 35 (as seen in the direction of fluid flow from the pump 30 to the cylinder-and-piston units 88, 89). However, it is also possible to install the valve 35 upstream of the valve 33.

The operation of the valve 33 can be influenced by at least one fluid pressure, such as at the port 4, and/or by a preselected regulating pressure and/or by at least one mechanically or electrically applied force such as a spring force and/or a magnetic force.

The just discussed hydraulic constituent or section of the improved apparatus can employ in part magnetic valves, such as proportioning valves, which receive signals from a central control system or unit 50. The latter has several inputs (only three are shown in FIG. 1) which transmit signals from various sensors serving to monitor several parameters of the motor vehicle, the power train of the motor vehicle, the transmission 99, and/or the prime mover of the power train. Examples of signals which can be processed by the control system 50 to operate the valves 33, 35 in accordance with a predetermined program are those denoting the speed of the motor vehicle, the engine RPM, the RPM of the rotary input element (98) of the transmission 99, the RPM of the rotary output element (96) of the transmission, and/or others. The incoming signals are processed by the electronic circuit of the control system 50 to ascertain the operating point, and the valves 33, 35 are adjusted accordingly.

The source 30 serves to supply pressurized hydraulic fluid to the torque sensor 1 which is installed between the input element (shaft) 12 and the output element 60. When the difference between the torques being applied to the input element 12 and to the output element 60 of the torque sensor 1 increases beyond that which is adequately related to fluid pressure in the plenum chamber 40, the pump 30 is free to communicate with the inlet opening 20, and hence with the chamber 40, via conduit 34, check valve 34a and port 3. If the improved apparatus employs a port 5 (to establish communication between the chamber 40 and the sump 31), such port is sealed by the axially movable valve member 11 when the source is free to supply pressurized fluid to the chamber 40. This entails an increase of fluid pressure in the chamber 40. The profiled portion 15 of the valve member 11 of the valve 2 bears upon the force- and torque-transmitting element(s) 16 in order to reestablish a state of equilibrium in response to appropriate angular adjustment of the profiled portion 15 relative to the profiled portion 14. Analogously, if the magnitude of the torque being transmitted between the input and output elements 12, 60 of the torque sensor 1 decreases, the flow of pressurized fluid from the source 30 into the plenum chamber 40 (via port 3 and inlet opening 20) is interrupted. If the valve 2 is provided with a port 5, such port is exposed to permit the fluid to flow from the plenum chamber 40 into the sump 31. This entails a reduction of fluid pressure in the chamber 40 and the profiled portions 14, 15 are angularly adjusted relative to each other to thus reestablish the state of equilibrium.

If the valve 2 does not comprise a port 5, the flow of hydraulic fluid from the chamber 40 into the sump 31 can take place by way of the aforediscussed flow restrictor 5a which is then installed at a locus other than in the port 5.

The torque sensor 1 can constitute a single-stage or a multi-stage sensor. If the torque sensor 1 is a multi-stage sensor, its characteristics (such as the fluid pressure in the chamber 40 and hence the fluid pressure in the cylinder-and-piston units 91, 92) can be determined as a function of one or more parameters such as the momentary ratio and/or the output RPM of the transmission 99. The torque sensor 1 can comprise additional plenum chambers which receive fluid in lieu of or in addition to an adjustment of the angular positions of the profiled portions 14, 15 relative to each other.

The slopes of the ramps on the profiled portions 14, 15 (as a function of the extent of angular displacement) can be uniform (constant), or they can vary continuously or stepwise. Reference may be had to published German patent applications Serial Nos. 195 44 644 and 42 34 294.

As used herein, the term "pressure reducing valve" is intended to denote a valve wherein the pressure at the inlet (20) is higher than at the outlet or outlets (20A and/or 20B).

To summarize: If the valve 2 is provided with an inlet opening 20 and two outlet openings 20A, 20B, the axially movable valve member 11 can be moved (relative to the rotary but axially fixed valve member 10) to a plurality of different positions. The outlet opening 20B is provided in the axially fixed valve member 10, the inlet opening 20 is provided in the axially movable valve member 11, and the outlet opening 20A is defined in part by the valve member 10 and in part by the valve member 11 (actually by a part 61 which sealingly engages the valve member 11).

The various axial positions of the valve member 11 render it possible to simultaneously at least partially expose the openings 20, 20B, to at least partially expose one of these openings while the other opening is sealed, or to seal the opening 20 simultaneously with the opening 20B. The opening 20A can remain exposed regardless of the conditions of the openings 20 and 20B.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of torque sensors and, therefore, such adaptations should and are intended to be comprehended within the meaning and range of equivalence of the appended claims.

What is claimed is:

1. A rotary torque sensor arranged to transmit torque between rotary input and output elements and having a finite torque-transmitting capacity, said sensor having a plenum chamber with a pressure inlet and first and second pressure outlets, the pressure inlet being connected with a source of pressurized fluid, the first pressure outlet being connected with a fluid collecting device and the second pressure outlet being connected continuously with at least one adjusting unit of a continuously variable transmission unit, the plenum chamber containing a hydraulic fluid under a pressure and comprising a valve arranged to control a flow of said hydraulic fluid into and from said chamber and to vary the pressure of said hydraulic fluid in said chamber and to thus influence the capacity of the sensor to transmit torque between said input and output elements, wherein in a first operating state of the valve the inlet is closed and the first and second outlets are open, in a second operating state the inlet is closed and the first outlet is closed, and in a third operating state the inlet is open and the first outlet is closed.

2. The torque sensor of claim 1, wherein said valve is a pressure reducing valve, said valve having at least two valve members at least one of which is movable relative to another of said valve members to thereby vary the pressure of said hydraulic fluid, said sensor having a source of pressurized fluid connectable to said chamber by said valve.

3. The torque sensor of claim 2, wherein one of said openings is provided in said other valve member, said other valve member being arranged to rotate with said input element.

4. The torque sensor of claim 2, wherein at least one of said openings is provided in said one valve member and said one valve member is arranged to rotate with said output element.

5. The torque sensor of claim 2, wherein said one valve member is movable relative to said other valve member to at least one position in which at least two of said openings are sealed.

6. The torque sensor of claim 5, wherein said at least two openings are said inlet opening and said first outlet opening.

7. The torque sensor of claim 2, wherein said one valve member is movable relative to said other valve member to at least one position in which said inlet opening and said first outlet opening are at least partially exposed to permit pressurized fluid to flow from said source to said chamber and from said chamber to said fluid collecting device.

8. The torque sensor of claim 2, wherein said one valve member is movable relative to said other valve member to at least one position in which said inlet opening is sealed to prevent pressurized fluid from flowing from said source into said chamber and said first outlet opening is sealed to prevent fluid from flowing between said chamber and said fluid collecting device.

9. The torque sensor of claim 2, wherein said one valve member is movable relative to said other valve member to at least one position in which said inlet opening is sealed to prevent pressurized fluid from flowing from said source into said chamber and said first outlet opening is at least partially exposed to permit fluid to flow between said chamber and said fluid collecting device.

10. The torque sensor of claim 2, wherein said one valve member and said other valve member respectively comprise first and second radially extending profiled portions and further comprising at least one torque- and force-transmitting element between said profiled portions.

11. The torque sensor of claim 10, wherein said other valve member is connected to said input element and said one valve member is connected to said output element.

12. The torque sensor of claim 11, wherein the force being transmitted by said at least one torque- and force-transmitting element is of a magnitude proportional to the pressure of fluid in said chamber.

13. The torque sensor of claim 2, wherein at least one of said openings is provided in said other valve member, said other valve member being arranged to rotate with said input element.

14. The torque sensor of claim 2, wherein at least one of said openings is provided in said one valve member, said one valve member being arranged to rotate with said output element.

15. The torque sensor of claim 2, wherein at least one of said openings is arranged to be sealed in response to movement of said one valve member relative to said other valve member.

16. The torque sensor of claim 2, wherein said one valve member is movable relative to said other valve member to at least one position in which said inlet opening is at least partially exposed to permit pressurized fluid to flow from said source into said chamber.

17. The torque sensor of claim 2, wherein said one valve member and said other valve member respectively comprise first and second at least substantially radially extending profiled portions and further comprising at least one torque- and force-transmitting element between said profiled portions.

18. The torque sensor of claim 17, wherein said other valve member is connected to said input element and said one valve member is connected to said output element.

19. The torque sensor of claim 18, wherein the magnitude of the force being transmitted by said at least one torque- and force-transmitting element is proportional to the pressure of fluid in said chamber.

* * * * *